Nov. 3, 1970   B. E. SHLESINGER, JR   3,538,486
CONNECTOR DEVICE WITH CLAMPING CONTACT MEANS
Filed May 25, 1967   3 Sheets-Sheet 1

INVENTOR
Bernard Edward Shlesinger Jr

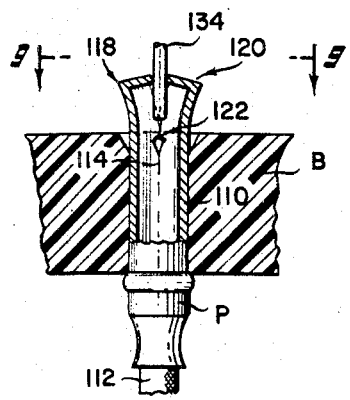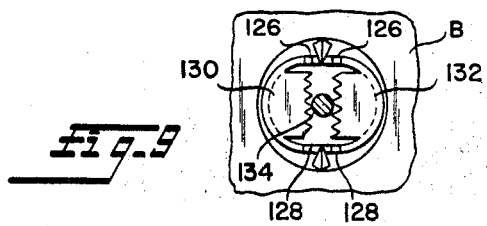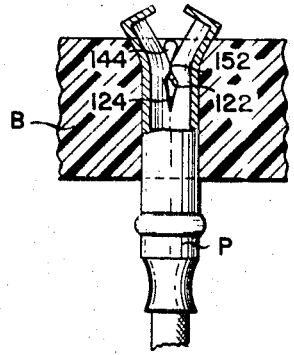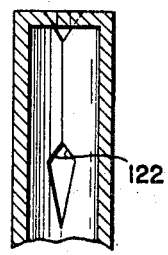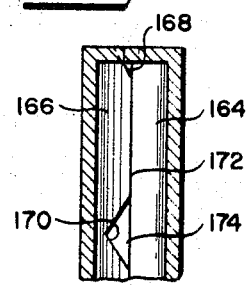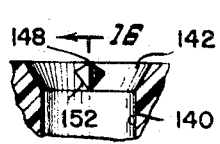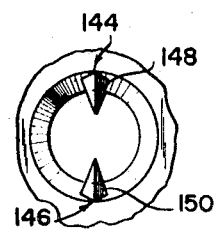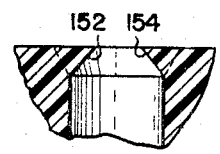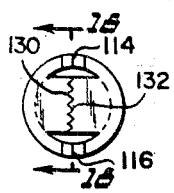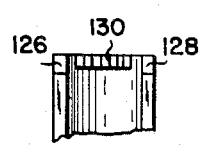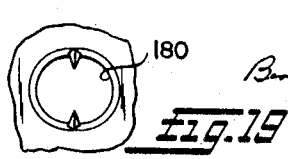

Nov. 3, 1970   B. E. SHLESINGER, JR   3,538,486
CONNECTOR DEVICE WITH CLAMPING CONTACT MEANS
Filed May 25, 1967   3 Sheets-Sheet 3

United States Patent Office 3,538,486
Patented Nov. 3, 1970

3,538,486
CONNECTOR DEVICE WITH CLAMPING CONTACT MEANS
Bernard Edward Shlesinger, Jr., Annandale, Va., assignor to AMP Incorporated, Harrisburg, Pa.
Continuation-in-part of application Ser. No. 405,158, Oct. 20, 1964. This application May 25, 1967, Ser. No. 641,177
Int. Cl. H01r 9/16
U.S. Cl. 339—74                          35 Claims

ABSTRACT OF THE DISCLOSURE

A connector device is disclosed for connecting electrical circuit paths which features an insulating block having contact receiving holes therein of a special geometry operable to engage surfaces of a mating contact plug inserted therein to cause such plug to operate in a clamping engagement with a contact pin mounted in such device.

SUMMARY OF THE INVENTION

This invention relates to improvements in electrical connecting devices and in particular to a connector device having a plug of a configuration to mate with a connector block to provide a gripping action and contact engagement with a conductor pin positioned by such block or portions thereof in mating relationship to such plug and is a continuation-in-part of my application Ser. No. 405,158, filed Oct. 20, 1964 and now abandoned.

It is an object of this invention to provide a connector block assembly including a positive gripping plug which will operate upon insertion into such assembly.

It is an additional object of this invention to provide a connector block which will cooperate with a plug which when inserted causes the clamp mechanism of the plug to grasp a contact pin secured in the block.

Still another object of this invention is to provide a plug and connector block which cooperate in such a manner that a contact pin will be released from the gripping action of the plug when the plug is withdrawn from the block.

It is a further object of this invention to provide a plug for connector blocks which will be firmly locked in the block upon insertion because of cooperating parts between the plug and the block.

Still another object of this invention is to provide a plug for a connector block having a cam operator which can be inserted at any degree of rotation and still provide operable gripping action.

Yet another object of this invention is to provide a plug for a connector block which permits easy insertion and a minimum of seeking in order to position the plug properly within the connector block for operation.

Still a further object of this invention is to provide a connector block and the plugs therefore which can be simply inexpensively manufactured.

Yet a further object of this invention is to provide a cam operated gripping plug for use in cam surfaced connector blocks which is constructed from a single piece of sheet metal.

Another object of this invention is a clamping plug which has a snap fit in a connector block plugboard.

These and objects and advantages will be apparent from the following description and claims.

In the accompanying drawings which illustrate by way of example various embodiments of this invention:

In the drawings:

FIG. 8 is a fragmentary cross-sectional view with a portion of the plug broken away illustrating another modification of this invention.

FIG. 9 is a top plan view taken along the lines 9—9 of FIG. 8 in view of the direction of the arrows.

FIG. 10 is a cross-sectional view illustrating a further modification of the connector block as taught by this invention.

FIG. 11 is an enlarged cross-sectional view of the plug and connector blocks showing the operation of the plug when partially inserted.

FIG. 12 is a fragmentary cross-sectional view of the end of the plug illustrated in FIG. 11.

FIG. 13 is a fragmentary cross-sectional view illustrating a modified plug.

FIG. 14 is an enlarged fragmentary cross-sectional view showing the opening of the connector block.

FIG. 15 is a top plan view looking down on the connector block showing a plug hole and the cam surfaces.

FIG. 16 is a cross-sectional view taken along the lines 16—16 of FIG. 14 showing the cam surfaces in the connector block.

FIG. 17 is a top plan view of the plug illustrated in FIG. 12.

FIG. 18 is a fragmentary cross-sectional view of the plug taken along the lines 18—18 in FIG. 17 and viewed in the direction of the arrows.

FIG. 19 is a top elevational view showing a further modification of the plug hole in the connector block.

In the figures, the block is generally indicated by B. The plug is generally illustrated by P.

DESCRIPTION OF PREFERRED EMBODIMENT

Figure 20:
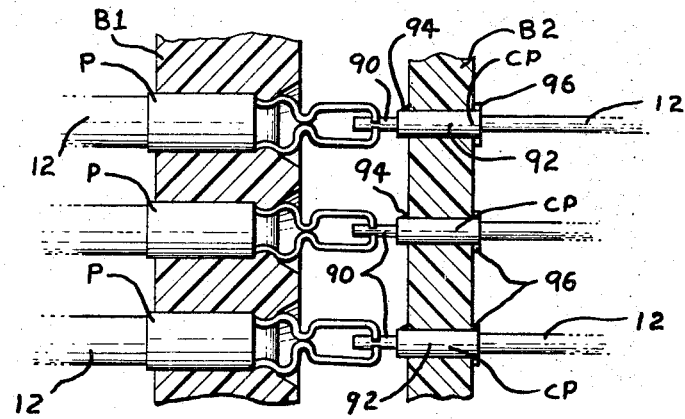
FIG. 20 is a cross-sectional view illustrating a multiple connector embodiment of the invention with contact plugs and pins shown as mounted in a connector block assembly.
Figure 21:
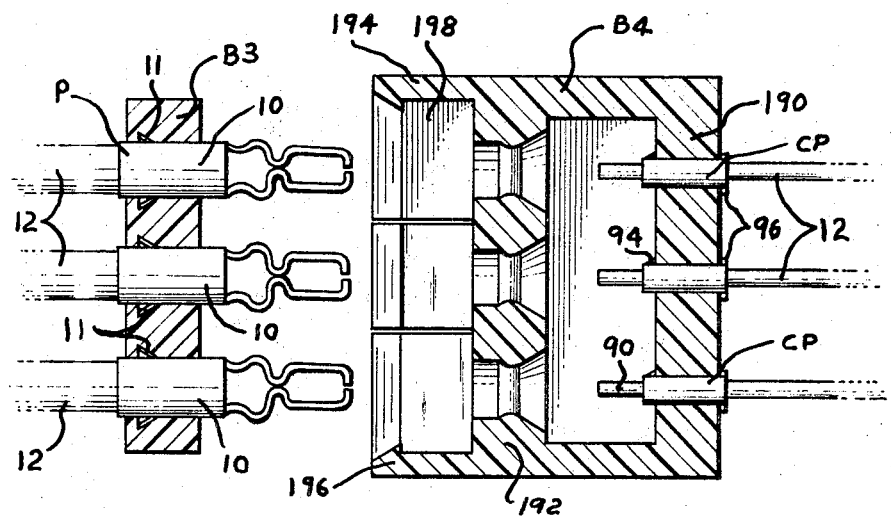
FIGS. 21 and 22 are cross-sectional views showing an alternative connector embodiment for multiple connections achieved simultaneously, the views representing the parts prior to and after engagement.
Figure 22:
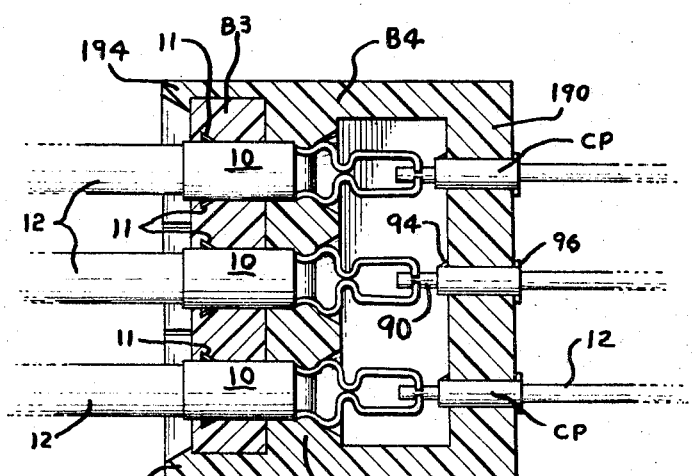

In the description immediately to follow the contact pin which is connected with P is shown only in part. FIGS. 20–22 may be referred to for a more complete teaching of the pin structure and mating block halves.

As illustrated in FIGS. 1–7, the plug P comprises a lower base portion 10 and an upper base portion 20. The entire plug P may be manufactured as will be obvious from a single piece of sheet metal stock and formed by stamping dyes into a sleeve-like configuration as illustrated.

The base portion 10 is crimped or otherwise secured to a lead 12. Extending from the base portion of the plug P is a pair of spring clamping members 30 and 40 which comprise the upper portion 20 of the plug P. The clamping members or arms 30 and 40 as illustrated are diametrically opposed to each other for clamping operation. It will be obvious that three or more members could be utilized on larger diameter plugs if warranted with only slight modification of the basic design.

Figure 1:
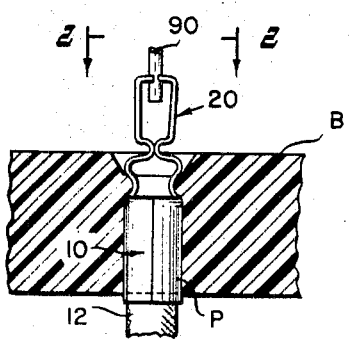
FIG. 1 is a cross-sectional view of half of a connector block having a plug as taught by this invention inserted therein and in grasping relation with a contact pin.
Figure 2:
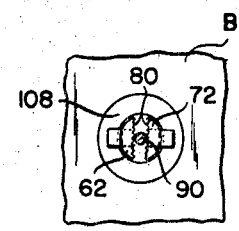
FIG. 2 is a top plan view taken along the lines 2—2 of FIG. 1 illustrating the grasping action of the plug on the contact pin.
Figure 3:
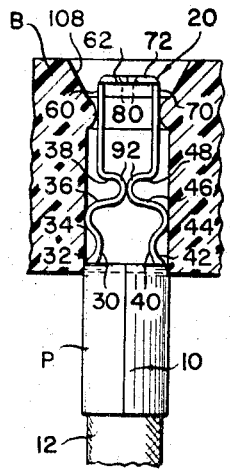
FIGS. 3, 4, 5 and 6 are fragmentary cross-sectional views of the block half showing the plug in various stages of insertion to illustrate the action.

The lower portion of the arms 30 and 40 initially bend inwardly as at 32 and 42. After the inward bends 32 and 42, there is an outward bend 34 and 44, respectively, followed by a further inward bend 36 and 46. Subsequent to the bends 36 and 46 are outward bends 38 and 48. Extending at right angles to the bends 38 and 48 are gripping arms 60 and 70 at the ends of which are gripping fingers 62 and 72. The gripping fingers 62 and 72 may be provided with serrations 80. As illustrated in FIG. 2, the gripping fingers 62 and 72 are wider than the arms 60 and 70 in order to provide a larger clamping surface for the contact pin 90 as illustrated in FIGS. 1 and 2.

Where the curved portions 36 and 38, 46 and 48 connect with one another are abutting rocking surfaces 92. The arrangement of rocking surfaces 92 and curved surfaces 32, 34, 36 and 42, 44 and 46 form an opening 94 between the clamping members. It is to be noted that the clamping arms 60 and 70 are relatively long in order to afford maximum clearance and leverage operation. In normal position, a certain amount of spring compression is exerted at the rocking surfaces 92 by the clamping arms 30 and 40.

Figure 7:
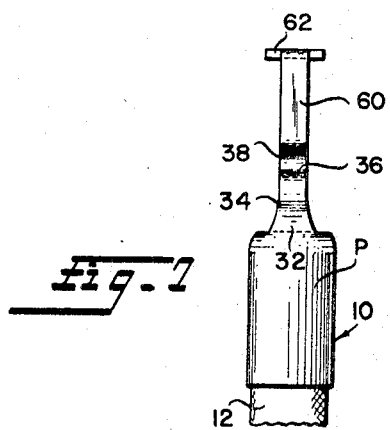
FIG. 7 is a side elevational view of a plug as used in FIGS. 1 through 6.

As illustrated in FIG. 7, the clamping members 30 and 40 are stiffened slightly at their connection with the lower portion 10 of the plug. The inward curved portion 32 as illustrated in FIG. 7 is slightly wider at the base in order to provide the necessary flexing action as will be explained hereinafter.

Figure 6:
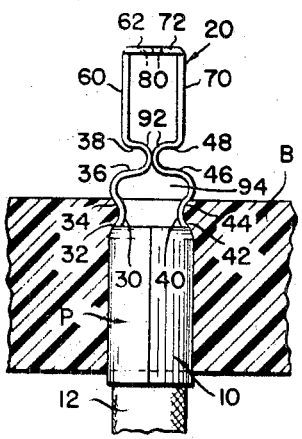

The block B is provided with a plug hole 100 having a slightly larger diameter than the plug P. An annular obstruction 102 is provided near or at the end of the bore or hole 100. The obstruction 102 has as the general appearance of a bead or rib in the bore or hole 100. The rib or bead 102 is provided with a lower cam surface 104 and an upper cam surface 106. Flaring outwardly from the cam surface 106 is an annular beveled surface 108. As illustrated in FIG. 6, the beveled surface shown in FIGS. 1 through 5 may be eliminated if desired. The primary purpose of the beveled area 108 is to provide a skirt on the block for surrounding a portion or all if necessary of the clamping arms 30 and 40 for shielding purposes or the like.

It is now to be noted that the arms 30 and 40 have an external separation slightly less than the minimum inside separation of the rib or bead 102. This permits the grasping fingers 62 and 72 and the arms 60 and 70 to pass easily through annular rib 102 without interfering therewith. It is now to be noted that the area of curvature of the clamping members 30 and 40 at the curved surfaces 34, 36 and 44 and 46 have an external separation slightly less than that of the bore or hole 100 but greater than the obstruction or rib 102.

It is preferable that the distance across the U formed by curved surfaces 32 and 34 and 42 and 44, respectively, be less than the height of the bead 102 in order to afford a good snap action when the plug P has been inserted fully into the board B. The thickened areas at 32 and 42 as illustrated in FIG. 7 will be designed to maintain a spring pressure outwardly on the rib 102 when the plug has been inserted in the block B. For maximum operation, the depth of the U formed by the curved portions 32, 34 and 42, 44 should be slightly less than the height or projection of the bead 102 into the bore or hole 100.

OPERATION FIGURES 1 THROUGH 7

Figure 4:
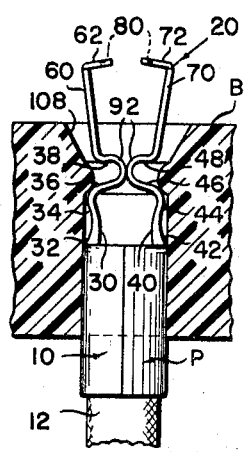
Figure 5:
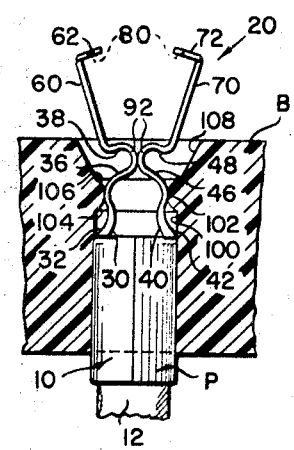

It will now be obvious that when the plug P is inserted into the hole 100, a cam surface 104 will first engage the cam surfaces 36 and 46 causing deflection of the clamping members 30 and 40 inwardly at the areas 34 and 44, as best illustrated in FIG. 4. The inward deflection causes rocking action at the rocking surfaces 92. The rocking action causes an opening of the clamping fingers 62 and 72. Further insertion of the plug P into the hole 100 further opens the arms 60 and 70 until areas 34 and 44 have passed the minimum diameter of the bead 102 at which time the arms 60 and 70 will begin to snap together about the contact pin 90 as the plug is inserted to its maximum. The spring load on the arms at the areas 32 and 42 will maintain the plug locked in the plugboard by constant pressure against the bead 102.

Upon withdrawal of the plug P, the cam surfaces 106 will engage the surfaces 34 and 44 causing inward deflection and further rocking about the rocking surfaces 92 thereby opening the clamping fingers 62 and 72, and releasing the contact pin 90.

It will be obvious that the clamping surfaces on the fingers 62 and 72 may be sharp or may be smooth as desired. The contact surface may be enlarged or lengthened as desired by increasing the thickness of the fingers 62 and 72 if a greater contact area is desired.

MODIFICATIONS

In FIG. 8, the plug P comprises a sleeve 110 crimped onto a lead 112. The sleeve 110 is generally tubular in configuration having the insertable end normally closed. The sleeve is slit from the top at 114 and 116. The slits 114 and 116 bifurcate the sleeve 110 forming gripping members 118 and 120. The slits 114 and 116 allow for flexure of the gripping members 118 and 120. The depth of these slits 114 and 116 will determine the flexure of the members 118 and 120. Formed in the members 118 and 120 are cam surfaces 122 as best shown in FIG. 11. These cam surfaces in the area of the slits 114 and 116 are located substantial distances from the top of the sleeve 110 and form openings 124 when the clamping members 118 and 120 are in relaxed position. At the top of the sleeve and formed at the beginning of the slits 114 and 116 are cam surfaces 126 and 128. Gripping fingers 130 and 132 as best seen in FIG. 9 are provided for grasping a contact pin 134. The fingers 130 and 132 may be serrated as illustrated in FIG. 9. They are shown to be relatively broad in order to afford as much gripping surface as possible.

The fingers 130 and 132 are set back from the cam surfaces 126 and 128, as best shown in FIG. 9, so as not to interfere for reasons hereinafter set out. In relaxed position, the gripping fingers 130 and 132 abut one another in the same manner as the gripping fingers 62 and 72 previously discussed with regard to FIGS. 1 through 7.

Referring now to the board B, as illustrated in FIGS. 14, 15 and 16, the block B is provided with a bore or hole 140 of generally uniform diameter throughout its length. Near the top of the hole 140 is a beveled surface 142 which extends annularly around the periphery of the opening of the block B. On opposite sides of the hole 140 and extending downwardly from the top surface of the board B and extending outwardly from the beveled surface 102 and projecting into the area defined by the opening 140, are cam operating members 144 and 146. The top surfaces 146 and 150 are wedge shaped cam surfaces. The lower edges 152 and 154 are also wedge shaped. In effect, wedges 148 and 150 are back to back with wedges 152 and 154, respectively.

A variation of the block B is illustrated in FIG. 10 in which the beveled surface is eliminated and the cam operators 160 and 162 are molded into or individually formed or adhesively secured to the block B on the top surface thereof. The cam members 160 and 162 have similar wedge shaped surfaces (not shown) as cam members 144 and 146.

FIG. 13 illustrates a slight modification of the structure illustrated in FIGS. 8 through 12 in that the clamping member 164 has no cam surfaces thereon. Clamping member 166 is provided with cam surfaces 168 and 170. In relaxed position, the slit 172 and the cam recess 170 form an opening 174. The cooperating cam surfaces on the block B are triangular in configuration rather than diamond shaped as noted in FIGS. 8, 11 and 12.

FIG. 19 shows a slight modification of the previous structures in that the opening 180 is slightly oblong. The pin used in this opening would be slightly oval in configuration in order to fit into the opening 180. The purpose of the oblong opening 180 is to positively position the plug P when it is inserted into the block so as to positively align the various cams and cam surfaces.

OPERATION OF FIGS. 8 THROUGH 21

In operation the plug P is inserted into the hole 140. As soon as the cam surfaces 126 and 128 engage the cam members 144 and 146, the lower cam wedges 152 and 154 start spreading the bifurcated plug B along the slits 114 and 116. The beveled surface 142 permits for lateral deflection of the bifurcated clamping members 118 and 120. As the plug is further inserted into the opening 140, the opening 124 formed by the cam surfaces 122 serves as a receptacle for the cam members 144 and 146 locking the plug in position and permitting the clamping fingers 130 and 132 to snap over the contact pin 134 as the arms 118 and 120 spring back to their normal position. A similar action takes place with the structure illustrated in FIG. 10.

When withdrawal of the plug is made, the upper cam wedges 148 and 150 of the cam members 144 and 146 engage the cam surfaces 122 of the plug forcing the clamping members 118 and 120 to again spread outwardly releasing the contact pin 134 to permit the plug P to be withdrawn from the opening 140.

It will be obvious upon insertion of the plug P, a slight rotation in either direction will positively position the cam surfaces 126 and 128 with respect to the cam surfaces 152 and 154 so that proper alignment for opening the jaws or clamping members 118 and 120 will be made. Such a positioning would be quite rapid and the modification of the opening as illustrated in the FIG. 19 would be necessary only in equipment which requires the pin to be initially inserted properly throughout the entire plug movement through the board B. It is obvious that other aligning devices may be used other than those illustrated.

The plug P illustrated in FIGS. 8 through 19 may be made of a single piece of sheet metal by stamping and die forming or the like or may be constructed from a piece of tubular stock which is subsequently formed.

Cam members 144 and 146 must extend a sufficient distance into the opening 140 so as to engage the cam surfaces on the plug P. They should not extend so far that they would interfere with the fingers 130 and 134.

It will now be readily seen that the block must vary with the size of the plug in order to have proper cooperation with the various cam surfaces.

Selection of metals and thicknesses will depend upon the amount of holding and spring action required. When the plug illustrated in FIGS. 8 through 19 has been inserted to its full extent, the cam members 144 and 146 will drop into the openings or holes 124 and thus lock the plugs in position.

In the description hereinabove presented, different embodiments of plug and block have been detailed. FIG. 20 represents a generalized embodiment showing the embodiment of FIG. 1 including mating block and contact pins. The block assembly is shown as comprised of a plug block B1 housing three plugs P and a connector pin block B2, housing connector pins CP. As can be discerned from FIG. 20, the plugs P are identical to those shown in FIG. 1. The contact pin CP includes the forward portion 90 supported by a barrel portion 92 fitted into a hole in the block B2 and held therein by a detent 94 struck out on the sidewall of the barrel portion. The contact pin CP is terminated at the rear end thereof by a stop portion shown as 96, connected to a conductive lead 12. In the embodiment of FIG. 20 means, not shown, may be considered as holding the blocks B1 and B2 in a fixed position relative to each other so that the individual plugs P may be plugged into the holes in B1 to effect an interconnection with an opposing contact pin CP. The assembly shown in FIG. 20 may be considered as a plug board with either the plugs P or the contact pins CP serving as inputs or outputs to electrical circuit paths. Either the plugs or the contact pins may be considered as patchcords with the other members serving as inputs and outputs to circuit paths if the assembly is used as a plugboard. The assembly may also be considered as a connector for connecting the leads of B1 to the leads of B2.

In FIGS. 21 and 22, the block structure is shown to include a block B3, which carries a plurality of plugs P affixed therein by detents 11, struck out from the base portion 10 of the plugs P, which are snapped into block B3. The mating half of the block shown as B4 includes a rear portion shown as 190, having a series of holes therein, into which a plurality of contact pins CP are inserted to be held by detents as in the embodiment shown in FIG. 20. Spaced from the portion 190 is a further portion 192 having holes therein of the geometry shown in the block B1 and in the example shown in FIG. 1 to accommodate the camming funtcion heretofore described. Adjoining 192 is a further portion 194 including flexible detents 196 extending out to engage and latch the block B3 in the position shown in FIG. 22. Cover portions 198 extend top and bottom over the detent structure; only 198 being shown in the sectional view. As block B3 is moved into position and seated within B4 the individual plug members are caused to be cammed open and closed to grip the contact pins as previously described.

I claim:
1. A connector assembly comprising a plug and connector block having contact pins extending therefrom:
 (a) said block including an opening,
 (b) said opening including a cam member constricting said opening,
 (c) a plug inserted into said opening,
 (d) said plug having cam means cooperating with said cam member to open said plug upon insertion and withdrawal of said plug,
 (e) said plug having gripping means for engaging a contact pin, and
 (f) means on said plug for releasing said gripping means for engagement with said contact pin when said plug has been inserted fully into said block.
2. The combination of claim 1 and wherein:
 (a) said cam member is a substantially annular rib.
3. The combination of claim 1 and wherein:
 (a) said cam member is wedge shaped.
4. The combination of claim 1 and wherein:
 (a) said plug has strap members having bends therein,
 (b) said plug cam means including said bends.
5. A contact engaging plug for electrical connector block having a cam surface comprising:
 (a) a contact sleeve,
 (b) said sleeve including a connector block engaging lower portion and a flexible contact engaging upper portion having proximal and distal ends,
 (c) said upper portion at said distal end including opposed inwardly directed gripping members having contact engaging and noncontact engaging positions and said members when in noncontact engaging position substantially abutting each other,
 (d) at least one of said gripping members having a cam engaging surface for cooperating with said connector block cam surface for deflecting outwardly at least one of said gripping members, and
 (e) cam surface disengaging means on said plug for releasing at least one of said deflected gripping members for engagement with said contact.
6. A contact engaging plug as in claim 5 and wherein:
 (a) said cam surface disengaging means is positioned between said lower portion and said gripping member cam surface.
7. A contact engaging plug as in claim 6 and wherein:
 (a) said cam surface disengaging means includes an opening between said gripping members.

8. A contact engaging plug for an electrical connector block having a cam surface comprising:
   (a) a contact sleeve,
   (b) said sleeve including a block engaging lower portion and a flexible contact engaging upper portion having proximal and distal ends,
   (c) said upper portion at said distal end including opposed inwardly directed flexible gripping members having contact engaging and noncontact engaging positions and said members when in noncontact engaging position substantially abutting each other,
   (d) said gripping members each having a first cam engaging surface for cooperating with said block cam surface for deflecting outwardly said gripping members when said plug is initially inserted into said block,
   (e) and cam surface disengaging means on said plug for releasing said deflected gripping members for engagement with said contact when said plug has been inserted fully into said block.

9. A contact engaging plug as in claim 8 and wherein.
   (a) said cam surface disengaging means is positioned between said lower portion and said gripping members first cam surfaces.

10. A contact engaging plug as in claim 9 and wherein:
    (a) said cam surface disengaging means includes an opening between said gripping members.

11. A contact engaging plug as in claim 8 and wherein:
    (a) said gripping members each include a second cam surface for cooperating with said block cam surface for deflecting said gripping members when said plug is withdrawn from said block.

12. A contact engaging plug as in claim 11 and wherein:
    (a) said second cam surfaces are positioned between said lower portion of said sleeve and said first cam surfaces.

13. A contact engaging plug as in claim 10 and wherein:
    (a) said opening between said gripping members is positioned a substantial distance below the top of said gripping members.

14. A contact engaging plug as in claim 13 and wherein:
    (a) said plug includes a second opening between said gripping members above said first mentioned opening.

15. A contact engaging plug as in claim 14 and wherein:
    (a) the proximal end of said gripping members is wider than the distal end of said gripping members.

16. A contact engaging plug as in claim 8 and wherein:
    (a) said gripping members each have a rocker surface, and
    (b) said rocker surfaces are in abutting relation.

17. A contact engaging plug as in claim 5 and including:
    (a) means on said plug for locking said plug in said block when said plug is fully inserted therein.

18. A contact engaging plug as in claim 8 and including:
    (a) means on said plug for locking said plug in said block when said plug is fully inserted therein.

19. A contact engaging plug as in claim 18 and wherein:
    (a) said locking means includes a recess in each of said gripping members.

20. A contact engaging plug as in claim 13 and wherein:
    (a) said openings are at the bottom of slits extending downwardly, from the top of the flexible portion on either side of said sleeve.

21. A contact engaging plug as in claim 13 and wherein:
    (a) said gripping members are straps having bends therein, and
    (b) the base of said straps are thickened to reduce flexure.

22. A contact engaging plug as in claim 8 and wherein:
    (a) said sleeve is flattened for positioning and anti-rotational purposes.

23. A connector block for use with a cammed contact engaging plug:
    (a) said block including an opening extending therethrough
    (b) said opening having a first portion of uniform cross-section throughout its length,
    (c) said opening having a second portion constricting said opening,
    (d) said second portion having a top cam for releasing said plug from engagement with a contact, and
    (e) said second portion including a bottom cam for opening said plug to permit said plug to pass said contact prior to engagement thereof.

24. A block as in claim 23 and wherein:
    (a) said cams are substantially annular surfaces.

25. A block as in claim 23 and wherein:
    (a) said cams are wedge shaped surfaces.

26. A block as in claim 25 and wherein:
    (a) said wedge shaped surfaces are adjacent the outer surface of said block.

27. A block as in claim 23 and wherein:
    (a) said opening includes a third portion flaring out from said second portion and having its greatest width, greater than said first portion.

28. The combination of a connector assembly including:
    (a) plug and receptacle connections,
    (b) said receptacle connection including an opening and a conductor in said opening,
    (c) said opening including a cam member having first and second cam means constricting said opening,
    (d) said plug connection inserted into said opening,
    (e) said plug connection having first cam means cooperating with said cam member first cam means to open said plug connection upon insertion and said plug connection having second cam means cooperating with said cam member second cam means to open said plug connection upon withdrawal of said plug connection,
    (f) said plug connection having gripping means for engaging said conductor, and
    (g) means on said plug connection for releasing said gripping means to permit engagement of said gripping means with said conductor when said plug connection has been inserted fully into said receptacle connection.

29. The combination of claim 28 and wherein:
    (a) said cam member is a substantially annular rib.

30. The combination of claim 28 and wherein:
    (a) said cam member is wedge shaped.

31. The combination of claim 28 and wherein:
    (a) said plug connection has strap members having bends therein,
    (b) said plug connection cam means including said bends.

32. An electrical contact engaging plug connector for fitting into a receptacle comprising:
    (a) a tubular body having one end including a first portion extending along one side of the longitudinal axis of said body to provide a first jaw,
    (b) said first jaw being channel-shaped in cross section with its concavity facing said longitudinal axis,
    (c) at least a portion of the edges of said first jaw being provided with teeth for engaging an electrical component, (d) means adapted to connect the other end of said body to an electrical lead,
(e) a second channel-shaped jaw having its concavity facing said longitudinal axis,
(f) said tubular body being integral with and extending below said first and second channel-shaped jaws, whereby said tubular body includes an upper portion formed by said first and second channel-shaped jaws and a lower portion integral and continuous with said upper portion and both sections being of substantially uniform diameter,
(g) said second channel-shaped jaw mounted on said body to pivot about an axis perpendicular to the longitudinal axis of said body and generally in line with the teeth of said first jaw,
(h) said pivot being located between the ends of said body,
(i) said second channel-shaped jaw having at least a portion of its edges formed to provide teeth mating with the teeth of said first jaw,
(j) the exterior surfaces of said jaws when closed defining in general a cylinder throughout the greater part of their length so as to fit into said receptacle,
(k) means for moving said jaws apart, and
(l) means for moving said jaws together.

33. A contact engaging plug and connector as in claim 32 and wherein:
(a) said body includes spring means for flexing at least one of said jaws.

34. A contact engaging plug and connector as in claim 32 and wherein:
(a) said means for moving said jaws apart includes a cam surface on one of said jaws abutting the other of said jaws.

35. A contact engaging plug and connector as in claim 32 and wherein:
(a) said means for moving said jaws together includes resilient flexible material for at least one of said jaws.

References Cited

UNITED STATES PATENTS

| | | | |
|---|---|---|---|
| 963,425 | 7/1910 | Dusinberre | 339—261 X |
| 1,515,860 | 11/1924 | Howard | 339—253 X |
| 2,702,895 | 2/1955 | Pavlinetz | 339—213 X |

FOREIGN PATENTS

| | | |
|---|---|---|
| 469,448 | 7/1937 | Great Britain. |
| 705,235 | 3/1954 | Great Britain. |
| 414,659 | 8/1946 | Italy. |

RICHARD E. MOORE, Primary Examiner

U.S. Cl. X.R.

339—174, 217